United States Patent [19]

Roncaglione

[11] Patent Number: 4,513,467
[45] Date of Patent: Apr. 30, 1985

[54] VEHICLE WASHING APPARATUS HAVING A YIELDABLE BRUSH SHAFT COUPLING

[76] Inventor: James W. Roncaglione, 9807 Bridleridge Ct., Vienna, Va. 22180

[21] Appl. No.: 613,018

[22] Filed: May 23, 1984

Related U.S. Application Data

[63] Continuation of Ser. No. 415,928, Sep. 8, 1982, abandoned.

[51] Int. Cl.³ .............................................. B60S 3/06
[52] U.S. Cl. ............................ 15/53 AB; 15/DIG. 2
[58] Field of Search ........... 15/53 A, 53 AB, DIG. 2, 15/87, 97 R; 464/81, 137

[56] References Cited

U.S. PATENT DOCUMENTS

| | | | |
|---|---|---|---|
| 1,546,071 | 7/1925 | Harris | 15/87 |
| 3,881,208 | 5/1975 | Miner . | |
| 4,021,877 | 5/1977 | Miner . | |
| 4,024,598 | 5/1977 | Miner . | |
| 4,198,722 | 4/1980 | Ennis . | |
| 4,225,995 | 10/1980 | Ennis . | |
| 4,270,958 | 6/1981 | Ennis . | |
| 4,299,003 | 11/1981 | Ennis . | |
| 4,332,625 | 6/1982 | Ennis . | |
| 4,354,291 | 10/1982 | Ennis . | |

FOREIGN PATENT DOCUMENTS

| | | |
|---|---|---|
| 1580082 | 5/1970 | Fed. Rep. of Germany . |
| 1936889 | 1/1971 | Fed. Rep. of Germany . |
| 1787014 | 5/1974 | Fed. Rep. of Germany . |

*Primary Examiner*—Edward L. Roberts
*Attorney, Agent, or Firm*—Birch, Stewart, Kolasch & Birch

[57] ABSTRACT

A car wash apparatus having an overhead supported rotatable brush which is rotatable about a generally vertical axis of rotation which utilizes an improved yieldable coupling. The yieldable coupling includes an upper support plate operably connected with a drive motor, a lower support plate operably connected with the rotatable brush, three or more rigid connecting members radially disposed about the vertical axis of rotation and biasing means for biasing the plates apart from each other.

8 Claims, 4 Drawing Figures

4,513,467

VEHICLE WASHING APPARATUS HAVING A YIELDABLE BRUSH SHAFT COUPLING

This application is a continuation, of application Ser. No. 415,928 filed on Sept. 8, 1982, now abandoned.

BACKGROUND OF THE INVENTION

1. Field of the Invention

The present invention relates to a vehicle washing apparatus having a drive shaft for a rotatable brush which contains a yieldable coupling.

2. Brief Description of the Prior Art

Various overhead mounted brushes for washing the front, sides and rear of vehicles being washed are known in the art. In order to prevent damage to vehicles being washed and in order to obtain efficient washing of vehicles, it is desirable to mount these overhead brushes in such a way that when the brushes contact the car, the brushes swing and/or slide out of the path of the car. It is also desirable to mount these brushes in such a manner that the brush can bend or flex relative to the drive shaft thereof. U.S. Pat. Nos. 3,881,208; 4,021,877 and 4,024,598 to Miner disclose vehicle washing brushes of this general type. U.S. Pat. Nos. 4,198,722; 4,270,958; 4,332,625 and 4,299,003 to Ennis disclose additional vehicle washing brushes for accomplishing the above-mentioned result. U.S. Pat. No. 4,035,862 to Ennis et al discloses similar vehicle washing brushes.

One of the problems associated with the car wash apparatus disclosed in the above-described Ennis and Ennis et al patents is that when the brushes contact a vehicle moving relative thereto, the brushes swing away from the vehicle and bounce out of the path of the car without properly washing the car. The present invention is therefore directed to solving this and other problems which will be discussed further hereinbelow which are associated with prior vehicle washing apparatus.

SUMMARY OF THE INVENTION

The present invention relates to a car wash apparatus and improved brush assembly therefor which is capable of washing the front, sides and rear surface of a vehicle being washed. Preferably, the vehicle washing apparatus includes two brushes which are mounted in the path of the vehicle to be washed. The vehicle washing apparatus can be of the drive-thru type wherein the vehicle washing apparatus is stationary and the vehicle is propelled therethrough. An example of this type of apparatus is disclosed in U.S. Pat. No. 4,225,995 to George T. Ennis which issued on Oct. 7 1980, the entire contents of which are hereby incorporated by reference. Alternatively, the vehicle washing apparatus can be of a type wherein the vehicle to be washed remains stationary and the apparatus moves relative thereto. An example of this type of apparatus is U.S. Pat. No. 4,320,551 to James W. Roncaglione which issued on Mar. 23, 1982, the entire contents of which are hereby incorporated by reference. When the front of the vehicle to be washed contacts the brushes, the brushes move apart to allow the vehicle to pass therebetween. As the vehicle moves between the brushes, the brushes wash respective sides of the vehicle and after the vehicle has passed therebetween, the brushes wash the back of the vehicle. The vehicle can easily pass in either direction through the vehicle washing apparatus by changing the rotation of the brushes in a conventional manner.

The brushes can be mounted in the vehicle washing apparatus in a variety of conventional manners. A preferred way of mounting the brushes is to mount each brush on an overhead brush support arm which is pivotal about a generally vertical axis. The two brushes are urged toward each other to a closed position in the path of a vehicle to be washed. Upon contact of the brushes with the vehicle being washed, the brush support arms and the brushes pivot out of the path of the vehicle to an open position and wash the sides of the vehicle as the vehicle passes therebetween. After the vehicle passes through the apparatus, the brushes return to the closed position.

The brushes are generally supported at the top only of the brush and do not contain a support for the bottom end of the brush. The overhead supported brushes of the present invention can also be employed in vehicle washing apparatus of the type disclosed in the previously mentioned Miner patents or other known car wash apparatus.

In a broad aspect, the present invention is directed to an improved yieldable coupling for the rotary shaft of a vehicle washing brush. The yieldable coupling, which is capable of flexing during rotation of the brush drive shaft, includes three or more yieldable connections which are equally radially disposed about the axis of rotation of the vehicle brush drive shaft. By utilizing the coupling of the present invention the brush does not bounce away from vehicles being washed as often happens with the brushes disclosed in the Ennis patents. Furthermore, the use of a shock absorber below the yieldable coupling such as is employed in the Ennis patents is not necessary to prevent excessive swinging movement of the brush. Also, the use of a universal joint of the type employed in the Miner patent, U.S. Pat. No. 3,881,209, is not necessary since the three or more radially disposed yieldable connections can be constructed in such a way as to provide support for the brush which is suspended therefrom and can also allow rotational movement to be transmitted from a drive shaft to the brush.

The car wash apparatus of the present invention may include a rotatable brush which is rotatable in a first normal position about a generally vertical axis of rotation for washing a vehicle moving relative thereto, a rotatable brush shaft secured to said rotatable brush, drive means for rotating said brush and yieldable coupling means for coupling said drive means with said rotatable shaft. The yieldable coupling means includes three or more yieldable connections radially disposed about the axis of rotation of said brush and/or drive shaft. The yieldable couplings allow said brush to tilt relative to said first normal position when the rotating brush contacts a vehicle being washed. In the preferred embodiment of the invention the coupling means includes an upper plate operably connected with the drive means by way of a drive shaft and a lower plate operably connected with the brush by way of a rotatable brush shaft. Preferably, each of the yieldable connections includes an elongate rigid inextensible connecting member connecting the upper and lower plate and a biasing member for biasing the plates away from each other and for biasing the brush toward the first normal position.

In a preferred embodiment each rigid connecting member is a bolt which passes through corresponding holes in each of the upper and lower plates, respectively. Each bolt has an enlarged portion at each end thereof to prevent the upper and lower plates from moving apart from each other more than a predetermined distance. At least one end of each bolt is loosely arranged in a corresponding hole of the upper or lower plate so that the upper and lower plates may move toward each other when pressure is applied to the brush during washing by contact of the brush with the vehicle being washed. Preferably, each end of each of said bolts is loosely arranged in a corresponding hole in the upper and lower plates, respectively.

In a preferred embodiment each of the biasing members are coil springs which are arranged around each of said bolts. The purpose of the coil springs is to urge the upper and lower plates apart and to bias the vehicle washing brush toward a first normal position.

By utilizing the coupling device of the present invention the tilting movement of the rotatable brush can be limited to a finite number of directions which corresponds to the number of yieldable connections utilized. Thus, the tilting movement of the brush of the present invention is limited to a finite number of directions whereas the brush disclosed in the Ennis patents is capable of flexing in any direction.

The coupling device of the present invention includes three or more yieldable connections, preferably 3 to 11 yieldable connections and more preferably an even number of yieldable connections such as 6.

DETAILED DESCRIPTION OF THE INVENTION

Figure 1:
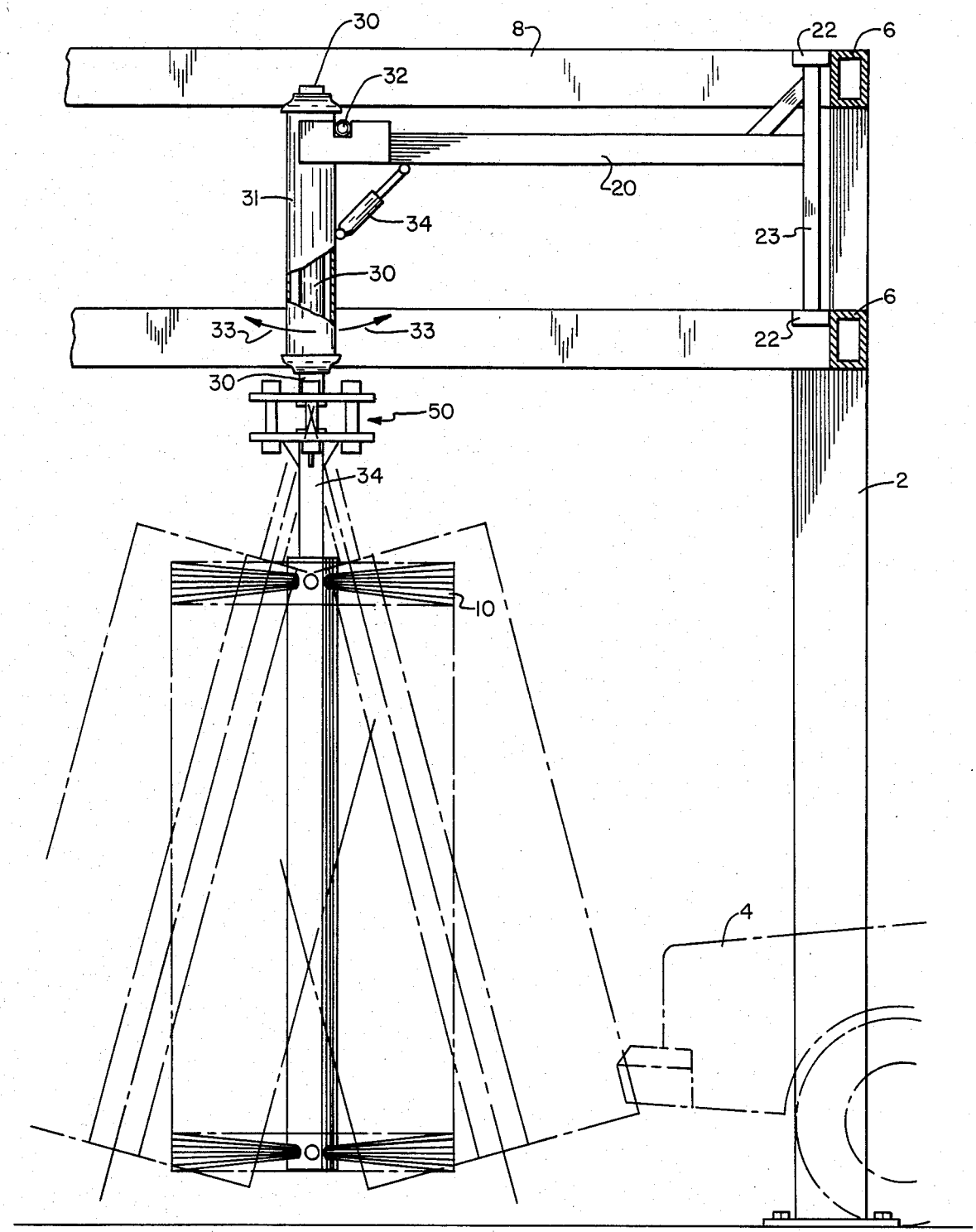
FIG. 1 is a side plan view of the side brush assembly of the present invention.

FIG. 1 discloses a vehicle washing apparatus of the drive-thru type which incorporates the improved brush and coupling therefor of the present invention. The apparatus includes a stationary support frame which includes a vertical support member 2 arranged on each side of the vehicle 4 to be washed. The stationary support frame includes one or more horizontal support members 6 which are arranged transversely to the direction of the vehicle passing therethrough and which are located above and in the path of the vehicle being washed. The apparatus also may include additional horizontal support members 8 which extend along the path of the vehicle to be washed to which additional brushes and/or vehicle washing equipment can be attached.

Each of the two vehicle washing brushes 10 (only one is shown) is supported by a pivotally mounted horizontal brush support arm 20 which is mounted for pivotal movement by a pair of vertically aligned bearings 22 and a vertical rod 23. The bearings 22 are preferably mounted on the support members 6 at a point overhead and inside the path of the vehicle to be washed in a manner similar to that disclosed in U.S. Pat No. 4,225,995 so that the length of the arms 20 can be kept to a minimum while at the same time obtaining efficient washing of the car. Alternatively, the bearings 22 can be mounted outside of the path of the vehicle to be washed. A conventional motor and transmission (not shown) are arranged on the support arm 20 at an appropriate location for imparting rotary motion to the brush 10. The brushes are urged to a closed position (see FIG. 1 of U.S. Pat. No. 4,225,995) in the path of the vehicle being washed by means of a conventional pulley, cable and weight system (not shown) of the type disclosed in U.S. Pat. No. 4,320,551 to James W. Roncaglione. Other devices can be used to urge the brushes toward a closed position in the path of a vehicle to be washed.

The motor rotates a generally vertical upper drive shaft 30 which is rotatably mounted within a housing 31. The housing 31 is pivotally connected with the arm 20 for movement about a horizontal pivot axis 32. Thus, the upper shaft is capable of swinging movement, corresponding to arrows 33, which is limited by shock absorber 34. The upper drive shaft 30 is connected with a lower rotatable brush shaft 34 by means of a yieldable coupling device 50.

Figure 2:
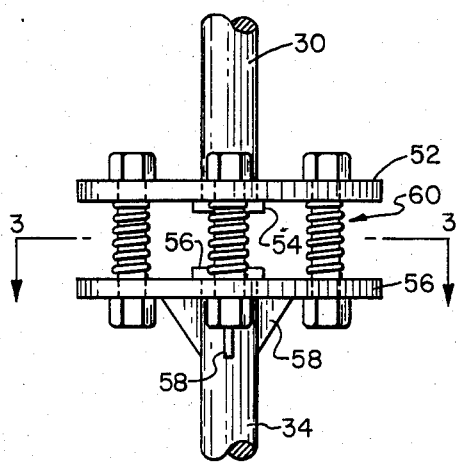
FIG. 2 is a side view of the coupling device of the present invention.
Figure 3:
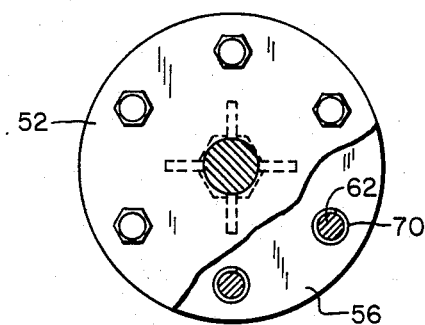
FIG. 3 is a top view of the coupling device of FIG. 2 which is partially broken away along line 3—3 of FIG. 2.
Figure 4:
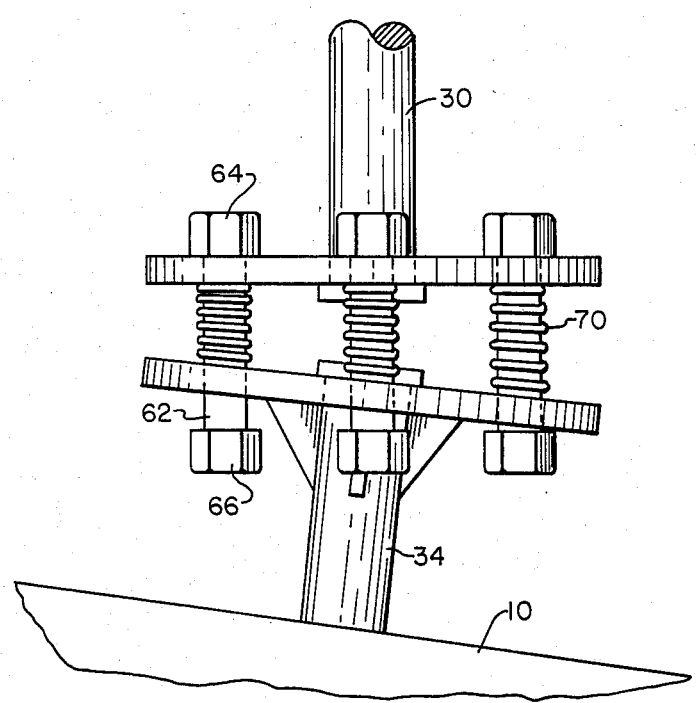
FIG. 4 is a side view of the coupling device of the present invention when the vehicle washing brush is tilted from the normal position.

As shown in more detail in FIGS. 2–4, the yieldable coupling device includes an upper support plate 52 formed of, for example, ½ inch steel plates. The upper plate 52 is welded to the upper rotatable drive shaft 30 adjacent to an enlarged portion 54. The lower rotatable brush shaft 34 is welded to the lower plate 56 adjacent to an enlarged portion 56. A plurality of triangular steel reinforcing plates 58 reinforce the connection between the lower rotatable brush shaft 34 and the lower support plate 56.

Each of the upper and lower plates contain six holes which are equally radially spaced about the axis of rotation of the upper shaft 30 and the lower shaft 34. The upper plate 52 and the lower plate 56 are connected by six rigid connecting members 60. The rigid connecting members, which are preferably ¾ inch bolts, contain an elongated inextensible connecting portion 62 which is slidably and loosely disposed within corresponding holes in the upper and lower plates. The hole through which each connecting portion passes is slightly larger than the connecting portion 62 so as to allow the upper and lower plates to move relative to each other. The hole, however, is small enough with respect to the connecting portion to allow torque to be efficiently transmitted from the upper plate 52 to the lower plate 56. The upper end of each bolt is preferably an enlarged head portion 64 which is integral with the elongated portion 62. The lower end of each bolt contains an enlarged portion 66 which may be a nut or other enlarged portion but which preferably is an enlarged portion which is fastened by means of a cotter pin for easy removal.

Circumferentially arranged around each rigid connecting member 60 and disposed between the upper and lower plates is a biasing member such as a two inch automotive valve spring 70.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A vehicle wash apparatus, comprising:

a generally horizontal overhead brush support arm wherein at least one end of said brush support arm is located above the path of a vehicle to be washed;

a generally vertical shaft housing pivotally connected with said support arm about a horizontal pivot axis;

a shock absorber connecting said shaft housing and said brush support arm for minimizing the swinging movement about said horizontal pivot axis between said shaft housing and said support arm;

an elongate rotatable brush arranged in the path of a vehicle to be washed, said rotatable brush being rotatable about a generally vertical axis of rotation for washing at least one end and one entire side surface of a vehicle moving relative thereto;

a lower rotatable shaft secured to said rotatable brush;

drive means for imparting rotational movement to said brush;

an upper rotatable shaft located in said shaft housing and being connected with said drive means; and coupling means for coupling said upper and lower rotatable shafts, said coupling means including (a) an upper plate secured to said upper shaft, (b) a lower plate secured to said lower shaft, and (c) three or more rigid connecting members radially disposed about said axis of rotation which operably connect said upper plate with said lower plate, which prevent said upper and lower plates from moving more than a predetermined distance apart from each other, and which allow said plates to tilt relative to each other during rotation of said brush from a first normal position when said brush is rotating freely about said generally vertical axis of rotation to a second washing position when said brush contacts a vehicle being washed and tilts from said generally vertical axis of rotation.

2. A vehicle wash apparatus according to claim 1, wherein each end of each of said connecting members is slidably connected with each of said upper and lower plates, respectively.

3. A vehicle wash apparatus according to claim 1, and further including biasing means for biasing said plates toward said first normal position during rotation of said brush.

4. A car wash apparatus according to claim 1, wherein said overhead brush support arm is pivotally connected with a frame.

5. A vehicle wash apparatus according to claim 1, wherein said coupling means includes three to eleven rigid connecting members.

6. A vehicle wash apparatus according to claim 1, wherein said coupling means includes an even number of rigid connecting members.

7. A vehicle wash apparatus according to claim 1, wherein said coupling means includes six rigid connecting members.

8. A vehicle wash apparatus according to claim 1, and further comprising a vertical pivot which pivotally connects said brush support art to a stationary frame.

* * * * *